United States Patent [19]

van den broek

[11] Patent Number: 4,926,764
[45] Date of Patent: May 22, 1990

[54] SEWAGE SLUDGE TREATMENT SYSTEM

[76] Inventor: Jos van den broek, Nijendal 30, 3972 KC Driebergen, Netherlands

[21] Appl. No.: 394,975

[22] Filed: Aug. 17, 1989

[51] Int. Cl.$^5$ .............................................. F23G 5/04
[52] U.S. Cl. .................................... 110/221; 110/226; 110/229; 110/215; 110/216; 110/238
[58] Field of Search ............... 110/221, 224, 226, 229, 110/238, 216, 219, 215

[56] References Cited

U.S. PATENT DOCUMENTS

| | | | |
|---|---|---|---|
| 3,410,233 | 11/1968 | Seiler | 110/224 |
| 3,716,339 | 2/1973 | Shigaki et al. | 110/226 |
| 3,859,933 | 1/1975 | Von Klenck | 110/219 |
| 4,040,190 | 8/1977 | van den Broek | 34/11 |
| 4,429,643 | 2/1984 | Mulholland | 110/238 |
| 4,583,470 | 4/1986 | Hirose | 110/224 |
| 4,739,715 | 4/1988 | Couarc'h et al. | 110/245 |

*Primary Examiner*—Edward G. Favors
*Assistant Examiner*—Denise L. Ferensie
*Attorney, Agent, or Firm*—Brooks & Kushman

[57] ABSTRACT

Gaseous discharge from a pelletizing drier used in the treatment of sewage sludge is partially directed back to a combustion chamber that generates an effluent which is fed to the drier. Volumetric requirements of a gas scrubber and an afterburner are reduced to the volume of gaseous discharge not recycled back to the combustion chamber. A concentrated stream of sewage sludge is mixed with a quantity of dehydrated particulate matter and supplied to a rotary pelletizing drier. Fuel and air undergo a combustion process and are mixed with additional air and part of the gaseous discharge in the combustion chamber which generates a hot gaseous effluent that is directed through the drier. The effluent removes moisture from the mixture of concentrated sludge and dehydrated particulate matter to provide dehydrated particulate sludge and the gaseous discharge. Entrained materials are initially separated from the gaseous discharge by cyclone separators. A gas flow proportioning valve is disposed in a duct system interconnecting the cyclone separators, gas scrubber and combustion chamber for directing a portion of the gaseous discharge back to the combustion chamber.

16 Claims, 5 Drawing Sheets

SEWAGE SLUDGE TREATMENT SYSTEM

TECHNICAL FIELD

The present invention relates to a waste water treatment system. More particularly, the invention relates to a energy efficient sewage sludge drying and pelletizing system with environmentally innocuous emissions.

Sewage sludge streams are processed by removing water and drying the sewage sludge to reduce the volume of the sludge. Conventional sewage processing plants include drying beds that require large tracts of land.

The concept of drying and pelletizing sewage sludge in a rotary drier disclosed in my prior U.S. Pat. No. 4,040,190 eliminates the need for drying beds and provides a pelletized by-product suitable for use as a fertilizer.

One objective of such system is to minimize the use of purchased fuels. Fuel usage can be minimized by applying heat recycling techniques as disclosed in U.S. Pat. No. 4,429,643 to Mulholland. The use of a furnace that burns a by-product of the sewage sludge system obtains benefit from the caloric content of the by-product without additional operating costs.

Another object of such system is to eliminate noxious emissions while minimizing energy consumption and capital investment. These and other long felt needs of municipal waste disposal systems are addressed by this invention.

SUMMARY OF THE INVENTION

The present invention relates to a sewage sludge stream treatment system. Sewage sludge is initially processed in the system by a dewatering apparatus which separates water from the sewage sludge stream to provide a concentrated stream. The concentrated stream is then mixed in a mixing unit with dehydrated particulate matter to provide a feedstock for drying. A rotary drier having vanes for tumbling and advancing the feedstock through the drier is in fluid flow communication with a gaseous effluent from a combustion chamber. The gaseous effluent is directed through the drier to remove moisture from the feedstock and convert it to a dehydrated particulate sludge. A moist gaseous discharge having fines, particulates and other entrained materials is produced by the drier. Entrained materials are initially separated from the gaseous discharge in a separator. Then, a gas scrubber is used to cool and remove remaining entrained materials from the gaseous discharge. The last step of the treatment system is to route the gaseous discharge through an afterburner which decomposes noxious components of the gaseous discharge.

According to this invention, a gas flow proportioning valve is provided in a duct system that interconnects the separator, gas scrubber and combustion chamber. The duct system directs a predetermined first portion of the gaseous discharge to the combustion chamber for recycling with a second portion being directed to the gas scrubber. In this way, energy use is reduced by the system because the first portion is a preheated input to the combustion chamber. Further, the volume of gaseous discharge routed through the gas scrubber and afterburner is reduced by the amount of the portion of gas recycled. Consequently, a smaller gas scrubber and afterburner may be used with concomitant reductions in energy required for operation.

According to another aspect of the present invention, the gases to be recycled contained in the second portion of the gaseous discharge pass through a vapor condensing gas scrubber. This gaseous effluent forms a third portion of the gaseous discharge and is directed to the drier being characterized by a temperature that is below the combustion point of the feedstock and of sufficient volume and low moisture content to permit absorption in the drier of moisture from the feedstock.

The fuel burned in the combustion chamber may be solid, liquid or gaseous. If solid, the fuel may be burned on a moving grid furnace, a fluid-bed furnace, a shelf furnace or an underfeed stoker. Suitable solid fuels include wood, coal, refuse derived fuel or dehydrated particulate sludge. The combustion chamber may also be provided with a burner for oil, natural gas or other hydrocarbon.

The dehydrated particulate matter mixed with the concentrated sludge stream is preferably part of the dehydrated particulate sludge previously produced by the rotary drier.

A fan is preferably located between the separator and the gas flow proportioning valve. The separator preferably includes a plurality of cyclonic separators arranged in a bank connected in parallel.

According to another aspect of the invention, the afterburner acts on the gaseous discharge prior to its being vented to the atmosphere through a stack. The stack may include a heat recovery apparatus for transferring heat from the gaseous discharge after passing through the afterburner to a part of the system in the fluid flow circuit passing through the rotary drier.

DETAILED DESCRIPTION

Figure 1:
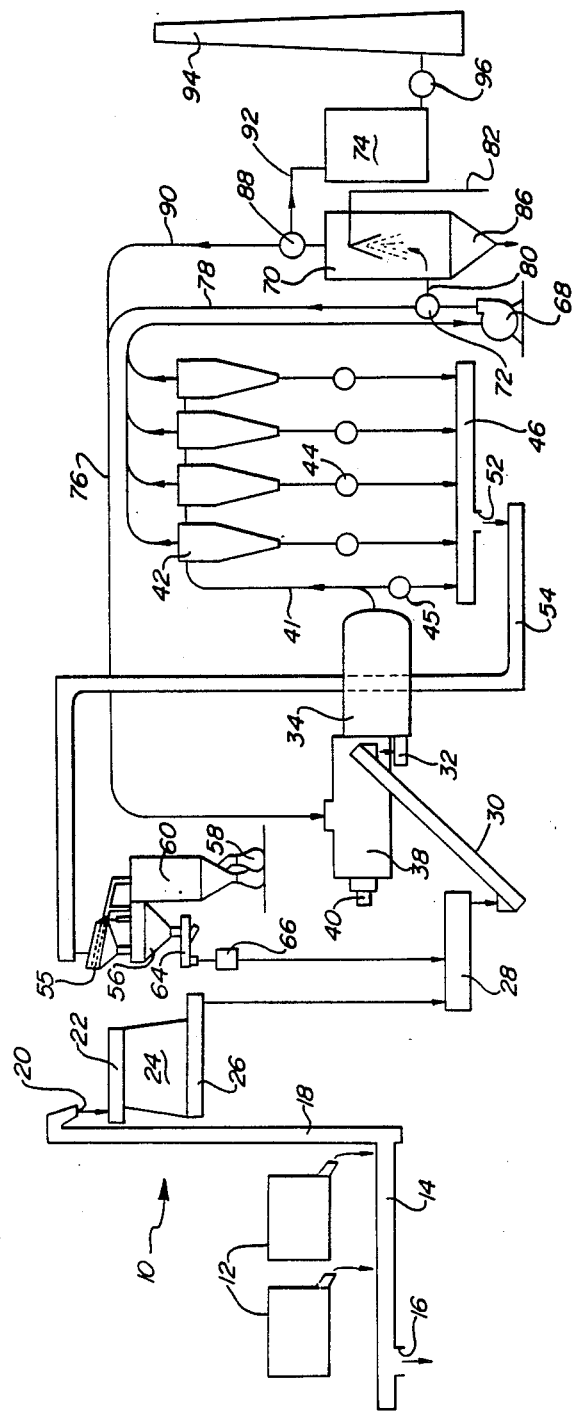
FIG. 1 is a flow chart diagrammatically showing the sewage sludge stream treatment system.
Figure 2:
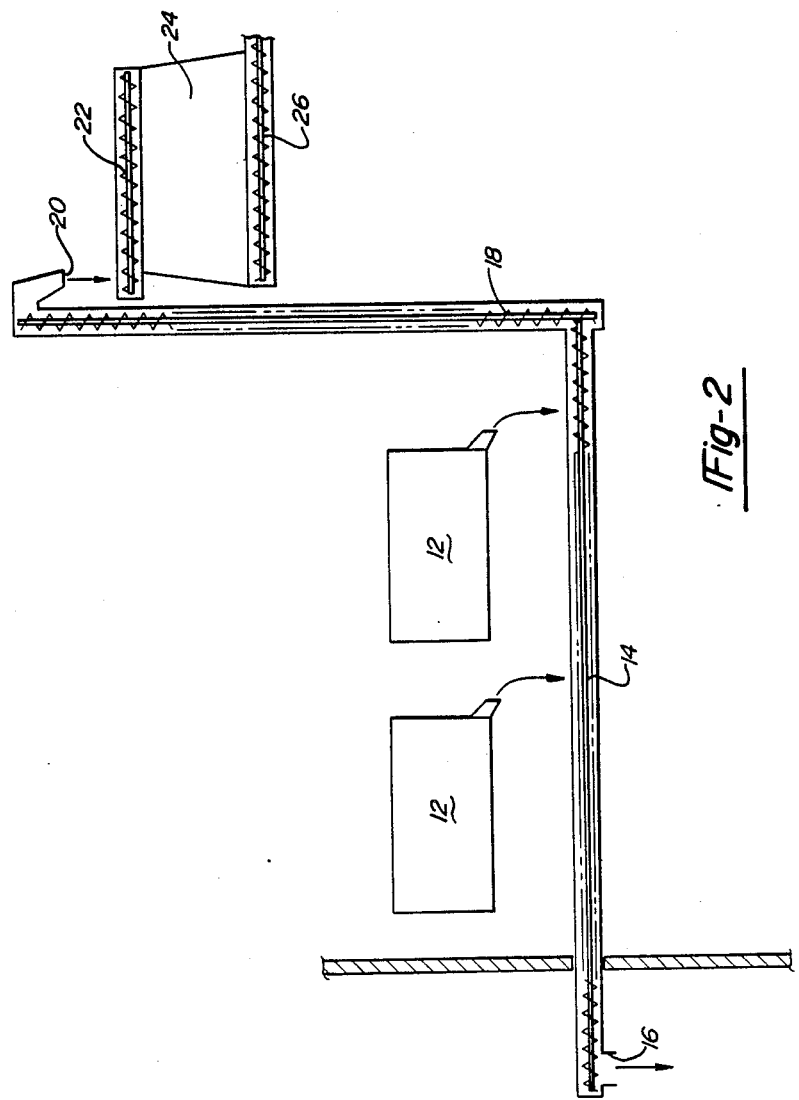
FIG. 2 is a flow chart diagrammatically showing the initial stage of the processing system.

Referring now to FIG. 1, a sewage sludge treatment system 10 is shown schematically from start to finish. In FIG. 2, the preliminary processing stages of the system 10 are shown in greater detail. Belt filter presses 12 are shown as the first step in the system. The belt filter presses 12 comprise an apparatus for dewatering a sewage sludge stream. Alternatively, the sewage sludge stream can be dewatered with plate frame filter press centrifuges or other compacting devices. The sewage sludge stream may be treated with chemicals to flocculate the sewage sludge stream and aid in dewatering.

After dewatering, the sewage sludge is deposited on a screw conveyor 14 as a concentrated stream. The screw conveyor includes an outlet 16 for draining water from the screw conveyor 14 or unloading dewatered sludge for other purposes. The screw conveyor 14 moves the concentrated stream to a upwardly conducting screw conveyor 18 which transports the concentrated stream to an outlet 20 which in turn deposits the concentrated stream on a distributor screw conveyor 22. The distributor screw conveyor 22 spreads the concentrated stream across a hopper 24 which stores the concentrated stream temporarily.

Figure 3:
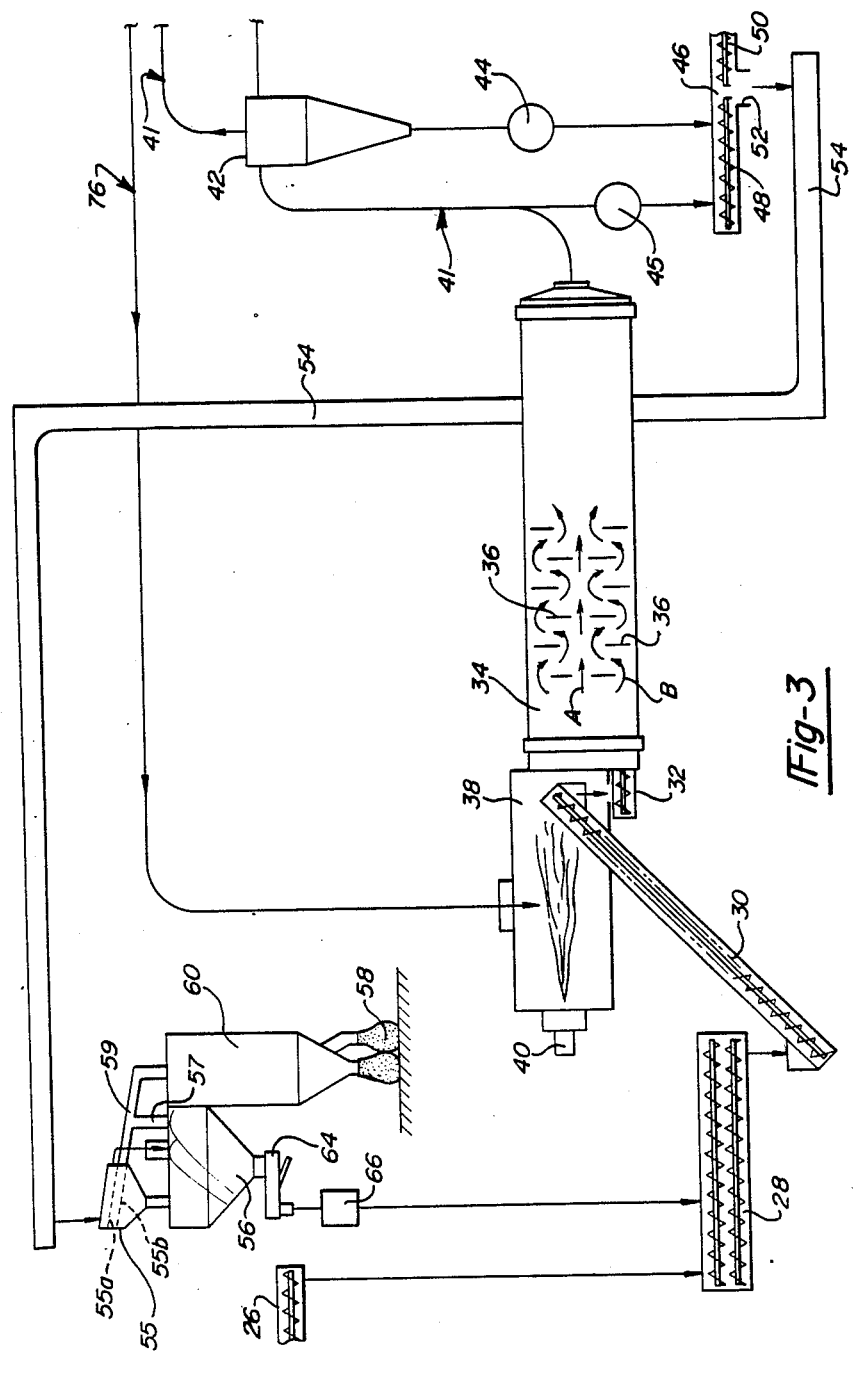
FIG. 3 is a flow chart diagrammatically showing the intermediate stage of the processing system.

In FIG. 3, a dosing screw conveyor 26 having a variable speed drive takes the concentrated stream from the hopper 24 and feeds it to a mixer 28 at a controlled rate. The mixer combines dehydrated particulate matter with the concentrated stream to provide a feedstock having a moisture content of from 30 to 50 percent. An inclined screw conveyor 30 transports the feedstock to a drier feed screw conveyor 32 which includes a variable speed drive for controllably feeding the sludge feedstock into a rotary drum drier 34.

The rotary drum drier 34 is a variable speed rotation drum drier for drying and pelletizing the sewage sludge. The rotary drum drier 34 includes vanes 36 that tumble and advance the sewage feedstock through the rotary drum drier. After drying, the dehydrated particulate sludge is deposited on a screw conveyor 48 via the rotary valve 45.

The rotary drum drier is connected to a combustion chamber 38, or furnace, which includes a burner 40 in the embodiment shown for burning gas or liquid fuel such as natural gas or oil. Alternatively, a solid fuel furnace could be used with the system of the present invention. A suitable furnace apparatus would include a moving grid furnace, a fluid-bed furnace, a shelf furnace or an underfeed stoker furnace. Fuels usable in the solid fuel furnaces may include wood, coal, refuse derived fuel or dehydrated particulate sludge.

Combustion products originating from the burner 40 are intermixed with makeup air in the combustion chamber 38 and form a hot gaseous effluent. The hot gaseous effluent flows through the rotary drum drier 34 as shown by arrows A as the sludge feedstock tumbles about the vanes as shown by arrows B.

The temperature of the gaseous effluent is controlled to maintain a temperature below the ignition point of the feedstock. The quantity of gases is maintained at a high enough level to permit absorption of the desired quantity of moisture from the sludge feedstock as it passes through the drier. The gaseous effluent entering the rotary drum drier exits as a cooler and more moisture laden gaseous discharge containing entrained materials such as dust particles and gases emitted from the sludge feedstock.

The gaseous discharge after exiting the rotary drum drier 34 is directed through a duct system 41 to a battery of cyclonic separators 42. The cyclonic separators separate dust and other particulate matter from the gaseous discharge. The materials separated from the gaseous discharge are then deposited by dust sluice 44 on a collector screw conveyor 46, along with the dehydrated particulate matter, or pelletized sludge. The collector screw conveyor 46 includes first and second screw conveyors 48 and 50 that move the dust and particulate matter to a discharge opening 52.

The discharge opening 52 deposits the contents of the collector screw conveyor 46 on a return screw conveyor 54. The return screw conveyor 54 transports the dehydrated particulate sludge, dust and particulate matter to screen unit 55.

Screen unit 55 includes an oversized screen 55a for separating oversized particles and an undersized screen 55b for separating fines. Fines and oversized particles are deposited in storage hopper 56 which retains the dehydrated particulate sludge for remixing with the concentrated stream of sewage sludge. A sufficient volume of material is maintained in the bunker to assure continued availability of material for remixing. After the storage hopper 56 is filled to the top of the chute 57, additional screened dehydrated particulate sludge is directed by overflow conduit 59 to a storage hopper 60. The dehydrated particulate sludge is removed from the storage hopper 60 and bagged for use as a fertilizer 58.

A vibrating conveyor 64 is provided at the lower end of the storage hopper 56. The vibrating conveyor 64 aids in feeding the dehydrated particulate sludge for remixing. The vibrating conveyor 64 is preferably a variable feed rate vibrating conveyor for providing dehydrated particulate sludge to a grinder 66 at a desired rate.

The grinder 66 preferably has coacting rollers which are adjustable to supply dehydrated particulate sludge at a selected granular size to the mixer 28. Granular size of the dehydrated particulate sludge provided is important in controlling the size of pellets formed in the rotary drum drier 34 as disclosed in U.S. Pat. No. 4,040,190, the disclosure of which is incorporated herein by reference.

Alternatively, the cyclone separators 42 may be replaced by a wet cyclone separator. In that case, all the granules will pass via rotary valve 45 and only screw conveyor 48 is maintained. Only fines reach the wet cyclone separator via duct 41. The wet fines leave the separator and flow to the waste water treatment plant.

Figure 4:
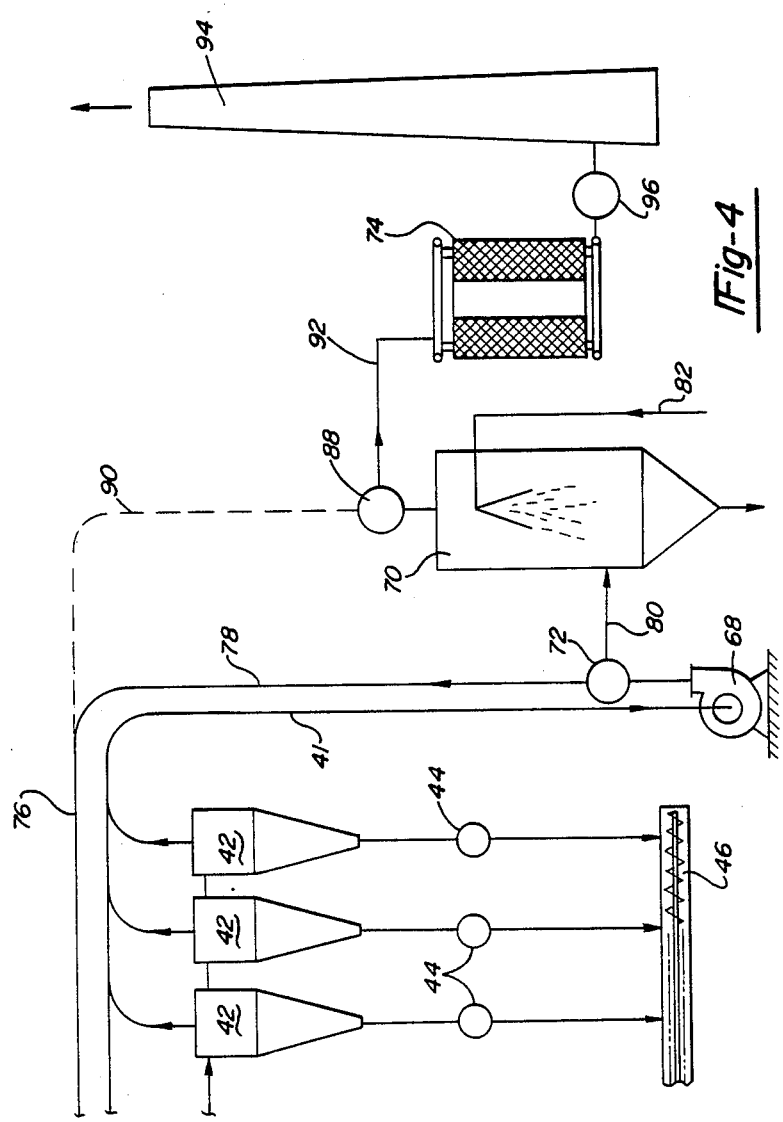
FIG. 4 is a flow chart diagrammatically showing the final processing stage for the gaseous discharge of the system.

Referring to FIG. 4, a fan 68 downstream from the cyclonic separators induces gas flow through the battery of cyclonic separators 42. The fan 68 is preferably connected in the duct system 41 between the battery of cyclonic separators 42 and a venturi washer 70 or other gas scrubber such as a packed-tower condenser which is effective to remove particulates and condense water vapor.

A proportional valve 72 is provided in a return duct 76 which directs a first portion of the gaseous discharge back to the combustion chamber 38. The first portion of the gaseous discharge has substantial thermal energy and a high moisture concentration. The first portion is mixed with the products of combustion from the burner 40 and other makeup air to provide the hot gaseous effluent to the rotary drum drier 34. The proportional valve 72 also directs a second portion of the gaseous discharge through a duct 80 to the venturi washer 70 for further removal of impurities, condensation of water vapor and cooling. The gaseous discharge upon leaving the venturi washer 70 is directed to an afterburner 74 by the duct 92. Water supply line 82 provides water to the washer 70.

The second portion of the gas after passing through the washer 70 may be selectively directed by a valve 88 through a duct 90 which extends from the valve 88 to the combustion chamber. Preferably, the duct 90 is connected for gas flow to the return duct 76. A duct 92 extends from the valve 88 to the afterburner 74.

Valve 72 is located upstream of the scrubber 70. Valve 88 is located downstream from the scrubber 70. By controlling with valve 72 and valve 88, three possibilities for recycling gas flow are available.

In the first mode, valve 72 would direct a portion of the gas flow through the duct 78 and back to the combustion chamber 38. In the first mode, the recycled gas has a high temperature, particulate and moisture content.

In the second mode, valve 72 would be closed with all of the gas flow being directed to the scrubber 70.

Valve 88 would be adjusted to direct a portion of the gas flow through the duct 90 and back to the combustion chamber 38. The recycled gas would then have a lower temperature, particulate and moisture content due to the cooling, scrubbing and condensation action of the scrubber 70.

In the third mode, valves 72 and 88 would both be adjusted to provide partial flow of recycled gas through the ducts 78 and 90, respectively and back to the combustion chamber 38. In this mode, the operative characteristics of the recycled gas flow in terms of heat, moisture and particulate content can be controlled between the levels defined by the first and second modes. This allows the treatment process to be controlled under all sludge conditions to minimize the heat requirements of the system.

The afterburner 74 is preferably a ceramic catalytic afterburner capable of heating the exhaust gases to approximately 1800° F. to decompose noxious components of the gaseous discharge.

It is an important objective of the invention to decompose all noxious components of the gaseous discharge prior to allowing the gaseous discharge to be vented to atmosphere through a stack 94. A closure valve 96 is preferably provided between the afterburner 74 and the stack 94 to prevent discharge of gases through the stack unless the afterburner is operating to specification.

Figure 5:
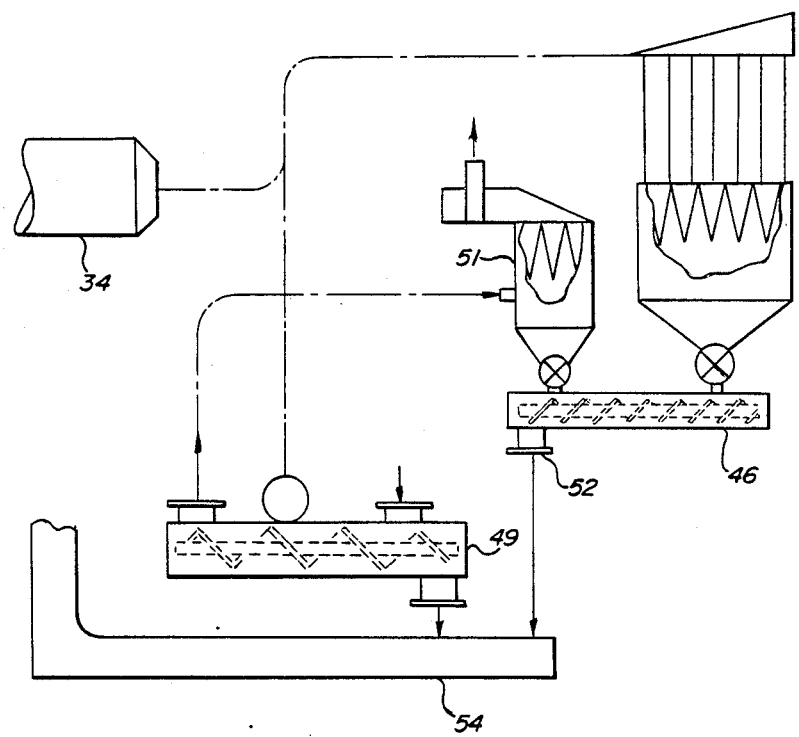
FIG. 5 is an alternative embodiment.

An alternative embodiment is illustrated in FIG. 5 in which screw conveyor 48 is replaced by a cooling screw conveyor 49. Ambient cooling air is conveyed through the screw conveyor and discharged to an air filter 51.

In a preferred embodiment of the invention, air is supplied to the burner with gaseous fuel to provide exhaust gases having a temperature of approximately 3000° F. Auxiliary makeup air at 60° F. to 110° F. is supplied to the combustion chamber along with recycled gaseous discharge at approximately 200° F. The hot gaseous effluent is supplied to the rotary drier at about 1200° F. to 1800° F. The temperature of gases supplied to the rotary drum drier must be less than the temperature required for combustion of the sludge feedstock. The gaseous discharge from the rotary drum drier is preferably at a temperature of about 212° F. The absorption of moisture from the sludge feedstock and heating of the sludge feedstock account for the reduction in temperature of the gaseous discharge.

The proportional valve 72 preferably directs between 20 percent and 40 percent of the gaseous discharge comprising the first portion of the gaseous discharge back to the combustion chamber. Consequently, the afterburner and venturi scrubber can be specified to reduced volumetric requirements. Less energy is required by the system for operating the venturi washer and for operation of the afterburner.

Energy savings are further realized by the recycling of the first portion of the gaseous discharge to the combustion chamber due to the heat energy contained in the gaseous discharge.

Modifications of the preferred embodiment described above will be apparent to those having ordinary skill in the art and are intended to be included within the scope of the following claims.

I claim:

1. A sewage sludge stream treatment system comprising:

a dewatering apparatus for separating water from the sewage sludge stream to provide a concentrated stream;

a mixing unit for combining a quantity of dehydrated particulate matter with the concentrated stream to provide a feedstock having a lower moisture content than the concentrated stream;

a rotary drier having means for tumbling and advancing the feedstock through the drier;

a combustion chamber in which fuel and gases undergo a combustion process generating exhaust gases which are mixed with other gases to produce a hot gaseous effluent, said hot gaseous effluent being directed through the drier to absorb moisture from the feedstock to provide dehydrated particulate sludge and producing a gaseous discharge having entrained materials;

at least one separator operative on said gaseous discharge for removing entrained materials from the gaseous discharge;

fan means operative on said gaseous discharge for inducing flow through the separator;

a first gas flow proportioning valve means operative on the gaseous discharge received from the separator for directing a first portion of said gaseous discharge to the combustion chamber;

a gas scrubber operative on a second portion of said gaseous discharge having a water flow path through which the gaseous discharge passes for cooling and removing entrained materials from the gaseous discharge;

a second gas flow proportioning valve means operative on said second portion of said gaseous discharge received from the gas scrubber for dividing said second portion into a third portion and a fourth portion, said third portion of said gaseous discharge being directed to the combustion chamber;

an afterburner operative on said fourth portion of said gaseous discharge to decompose noxious components of said fourth portion; and whereby energy use is reduced by the introduction of the first and third portions of gaseous discharge into the combustion chamber and by reducing the volume of gaseous discharge routed through the gas scrubber to the volume of the second portion which decreases the volumetric requirements of the gas scrubber and by reducing the volume of gaseous discharge routed through the afterburner to the volume of the fourth portion which decreases energy use requirements of the afterburner.

2. The system of claim 1 wherein the temperature and humidity of the hot gaseous effluent is adjusted by changing the volume of said first portion and said third portion by adjusting said first and second gas flow proportioning valve means to obtain a predetermined moisture level in the dehydrated particulate sludge thereby compensating for variation in the composition of the sewage sludge stream.

3. The system of claim 1 wherein said gases undergoing the combustion process include air at ambient temperature and said first portion of gaseous discharge, said gases being combined with the products of the combustion process to provide said hot gaseous effluent which is characterized by a temperature that is below the combustion point of the feedstock and in sufficient volume and low moisture content to permit absorption in the drier of moisture from the feedstock to obtain a predetermined moisture level in the dehydrated particulate sludge.

4. The system of claim 1 wherein a part of said fuel is solid fuel burned on a furnace apparatus selected from the group of furnaces including:
   a moving grid furnace,
   a fluid-bed furnace,
   a shelf furnace, or
   an underfeed stoker.

5. The system of claim 4 wherein said fuel is selected from the group of solid fuels including:
   wood,
   coal,
   refuse derived fuel, or
   dehydrated particulate sludge.

6. The system of claim 1 wherein said fuel is in liquid or gaseous form.

7. The system of claim 1 wherein the dehydrated particulate matter is dehydrated particulate sludge previously produced by the rotary drier.

8. The system of claim 1 wherein said fan is disposed between the separator and the gas flow proportioning valve.

9. The system of claim 1 wherein said separator includes a plurality of cyclonic separators arranged in a bank connected in series.

10. In the system of claim 1, said afterburner being vented to atmosphere through a stack.

11. The system of claim 10 wherein said stack includes a heat recovery apparatus for transferring heat from the gaseous discharge after passing through the afterburner.

12. A sewage sludge stream treatment system wherein a concentrated stream of sewage is dried in a rotary drier by a hot gaseous effluent from a combustion chamber, the gaseous discharge from the rotary drier having entrained particulate matter and a high moisture content, the gaseous discharge is further processed sequentially by mechanically separating particulate materials, scrubbing in a wet gas scrubber and heating in an afterburner prior to being vented to the atmosphere wherein the improvement comprises:
   a proportional valve means downstream from the rotary drier for directing a portion of the gaseous discharge to an inlet port in the combustion chamber whereby energy requirements of the system are reduced by the use of preheated gases in the combustion chamber and by reducing the volumetric requirements of the afterburner.

13. The sewage sludge stream treatment system of claim 12 wherein the proportional valve means directs said portion of the gaseous discharge prior to scrubbing in the wet gas scrubber.

14. The sewage sludge stream treatment system of claim 12 wherein the proportional valve means directs said portion of the gaseous discharge after scrubbing in the wet gas scrubber.

15. The sewage sludge stream treatment system of claim 12 wherein said proportional valve means directs said portion of the gaseous discharge prior to scrubbing in the wet gas scrubber, and a second proportional valve means is provided after scrubbing in the wet gas scrubber for directing a third portion of the gaseous discharge to the inlet port in the combustion chamber.

16. The sewage sludge stream treatment system of claim 15 wherein the temperature and humidity of the hot gaseous effluent is adjusted by changing the volume of said portion of the gaseous discharge prior to scrubbing in the wet gas scrubber and by changing the volume of said second portion of the gaseous discharge to obtain a predetermined moisture level in the dehydrated particulate sludge thereby compensating for variation in the composition of the sewage sludge stream.

* * * * *